(12) United States Patent
Oonishi et al.

(10) Patent No.: US 10,284,791 B2
(45) Date of Patent: May 7, 2019

(54) DISPLAY APPARATUS, SETTING METHOD FOR DISPLAY APPARATUS, AND DISPLAY SYSTEM

(71) Applicant: Sharp Kabushiki Kaisha, Sakai, Osaka (JP)

(72) Inventors: Yoshinori Oonishi, Sakai (JP); Hiroki Onoue, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/969,808

(22) Filed: May 3, 2018

(65) Prior Publication Data

US 2018/0332237 A1 Nov. 15, 2018

(30) Foreign Application Priority Data

May 12, 2017 (JP) ................. 2017-095682

(51) Int. Cl.
*H04N 5/268* (2006.01)
*H04N 5/445* (2011.01)
*H04N 5/44* (2011.01)
*G09G 5/00* (2006.01)

(52) U.S. Cl.
CPC ............ *H04N 5/268* (2013.01); *G09G 5/006* (2013.01); *H04N 5/4403* (2013.01); *H04N 5/44504* (2013.01); *G09G 2370/04* (2013.01); *G09G 2370/12* (2013.01)

(58) Field of Classification Search
CPC .. H04N 5/268; H04N 5/4403; H04N 5/44504; G09G 5/006; G09G 2370/04; G09G 2370/12

USPC ......................................................... 348/553
See application file for complete search history.

(56) References Cited

U.S. PATENT DOCUMENTS

| 7,178,157 | B1* | 2/2007 | Kimura | H04H 60/80 |
| | | | | 348/E5.102 |
| 2008/0294763 | A1* | 11/2008 | Uchida | G06F 3/1454 |
| | | | | 709/223 |
| 2011/0032433 | A1* | 2/2011 | Sato | G09G 5/006 |
| | | | | 348/705 |
| 2011/0257238 | A1* | 10/2011 | Boral | C07D 471/04 |
| | | | | 514/414 |
| 2015/0121409 | A1* | 4/2015 | Zhang | H04N 21/6582 |
| | | | | 725/18 |
| 2015/0154728 | A1* | 6/2015 | Nara | G06F 3/0488 |
| | | | | 345/157 |

(Continued)

FOREIGN PATENT DOCUMENTS

JP 2005-267617 A 9/2005

*Primary Examiner* — Michael Lee
(74) *Attorney, Agent, or Firm* — Keating & Bennett, LLP

(57) ABSTRACT

Provided is a display on which an operation is performed by an information processing apparatus that is connected to the display. The display includes a USB terminal, a first video input terminal, a second video input terminal, an input signal processing unit that transmits inherent information of the display to the information processing apparatus, and a video terminal/USB terminal associating processing unit that determines, on the basis of inherent information transmitted from the information processing apparatus, whether or not the information processing apparatus is connected to a video input terminal of the display, and specifies the video input terminal connected to the information processing apparatus.

6 Claims, 8 Drawing Sheets

(56) References Cited

U.S. PATENT DOCUMENTS

2016/0210769 A1* 7/2016 Suryanarayana ....... G06T 11/60
2016/0337191 A1* 11/2016 Li ......................... H04W 24/02

* cited by examiner

DISPLAY APPARATUS, SETTING METHOD FOR DISPLAY APPARATUS, AND DISPLAY SYSTEM

BACKGROUND

1. Field

The present disclosure relates to a display apparatus, a setting method for a display apparatus, and a display system.

2. Description of the Related Art

In recent years, the size of screens of various apparatuses, such as a computer and an AV apparatus, that display content has been increasing. Known examples of such apparatuses include an apparatus that uses a display apparatus with a large screen on which a touch operation may be performed and causes a large number of contents to be displayed together, and an apparatus including one display screen shared by two or more users.

In a display 10A with a large screen according to the related art, for example, as illustrated in FIG. 9, on a side surface side and a bottom surface side of a back surface 101A of the display 10A, USB terminals which are used for touch output and two or more video input terminals are arranged, and the display 10A is configured to allow connection of two or more information terminal apparatuses (PCs) 20A. Specifically, a USB terminal 131a, a HDMI 1 terminal 141a, a display port 1 terminal 151a are arranged on the bottom surface side, and a USB terminal 132a, a HDMI 2 terminal 142a, a HDMI 3 terminal 143a, a display port 2 terminal 152a, and a D-sub terminal 153a are arranged on the side surface side.

In the display 10A, a combination of the HDMI 1 terminal 141a, the HDMI 2 terminal 142a, the HDMI 3 terminal 143a, the display port 1 terminal 151a, the display port 2 terminal 152a, or the D-sub terminal 153a each of which is the video input terminal and the USB terminal 131a or 132a which is used for touch output is displayed on the display 10 and is able to be set by a "touch output setting" menu, for example.

For example, in a case where a conference is carried out by using the display 10A with the large screen, when a participant of the conference brings an information terminal apparatus (PC) 20A and connects a USB cable 130b and a video cable 140b to the USB terminal 132a and the HDMI 2 terminal 142a respectively on the side surface side of the display 10A as illustrated in FIG. 9, "side surface USB: HDMI 2" is set as "touch output setting".

The "touch output setting" is normally performed manually by a user who is the participant of the conference. Since a video input terminal and a USB terminal to be connected vary depending on a PC to be used, there is a problem that resetting is performed each time for different PCs and it is burdensome. In addition, the display 10A may perform touch output for an unintended PC depending on setting and there is a problem that productivity of the conference is reduced.

Then, as a related art, for example, Japanese Unexamined Patent Application Publication No. 2005-267617 discloses a port detection apparatus capable of automatically executing calibration of a multi-monitor environment where two or more monitors are connected, and a port detection method capable of detecting a combination of a control signal port (USB terminal) and a video signal port (video input terminal) that are connected to each of the monitors.

In addition, it is disclosed that, via the control signal port and the video signal port that are connected to each of the monitors, first inherent data (human interface device (HID) table) and second inherent data (extended display identification data (EDID)) in the monitor are acquired, and a combination of the control signal port and the video signal port that are connected to each of the monitors is detected on the basis of the first inherent data and the second inherent data.

In the related art described in Japanese Unexamined Patent Application Publication No. 2005-267617, the combination of the control signal port and the video signal port that are connected to the monitor is able to be detected on the basis of the first inherent data (HID table) and the second inherent data (EDID) in each of the monitors, which are acquired via the control signal port and the video signal port, however a combination of a control signal port and a video signal port for two or more terminal apparatuses connected to a display apparatus is not set.

The disclosure is made in view of the aforementioned problems and provides a display apparatus, a method in a display apparatus for setting an information terminal apparatus, and a display system in which a combination of connection states of a control signal connection unit and a video signal connection unit is easily set in connection between the display apparatus and two or more information terminal apparatuses connected to the display apparatus.

SUMMARY

The disclosure provides a display apparatus connectable to an information terminal apparatus in which setting processing is able to be performed on a basis of a control signal that is received, and the display apparatus includes: a control signal connection unit (for example, USB terminal) by which connection for communicating a control signal is performed with the information terminal apparatus (for example, information processing apparatus (PC)); two or more video signal connection units (for example, video input terminals) by each of which connection for communicating a video signal is performed with the information terminal apparatus; and a setting processing unit (video terminal/USB terminal associating processing unit) that requests (for example, transmits an information acquisition request command), to the information terminal apparatus connected to the control signal connection unit, inherent information acquired from the display apparatus connected to the information terminal apparatus, determines, on a basis of the inherent information received from the information terminal apparatus, whether or not the information terminal apparatus is connected to a video signal connection unit of the display apparatus, and specifies the control signal connection unit and the video signal connection unit that are connected to the information terminal apparatus.

In the disclosure, the term "inherent information" refers to information, with which a display apparatus and a video input terminal are specified, and includes, for example, manufacturer's name, model name, product code, serial number information, connection terminal information, and other information based on EDID information of the display apparatus.

The disclosure provides a setting method for a display apparatus connectable to an information terminal apparatus in which setting processing is able to be performed on a basis of a control signal that is received, and the setting method includes: performing connection for communicating a control signal with the information terminal apparatus;

performing connection for communicating a video signal with the information terminal apparatus; requesting, to the information terminal apparatus that is connected so as to allow communication of the control signal, inherent information acquired from the display apparatus connected to the information terminal apparatus; determining, on a basis of the inherent information received from the information terminal apparatus, whether or not the information terminal apparatus is connected to the display apparatus so as to allow communication of a video signal; and specifying a connection unit allowing communication of a control signal and a communication unit allowing communication of a video signal, which are connected to the information terminal apparatus.

The disclosure provides a display system including a display apparatus connectable to an information terminal apparatus in which setting processing is able to be performed on a basis of a control signal that is received and an information terminal apparatus that is able to be connected to the display apparatus. The display apparatus includes: a control signal connection unit by which connection for communicating a control signal is performed with the information terminal apparatus; two or more video signal connection units by each of which connection for communicating a video signal is performed with the information terminal apparatus; and a setting processing unit that requests, to the information terminal apparatus connected to the control signal connection unit, inherent information acquired from the display apparatus connected to the information terminal apparatus, determines, on a basis of the inherent information received from the information terminal apparatus, whether or not the information terminal apparatus is connected to a video signal connection unit of the display apparatus, and specifies the control signal connection unit and the video signal connection unit that are connected to the information terminal apparatus.

DESCRIPTION OF THE EMBODIMENTS

First Embodiment

Hereinafter, embodiments for carrying out a display system according to the disclosure will be described with reference to drawings.

Figure 1:
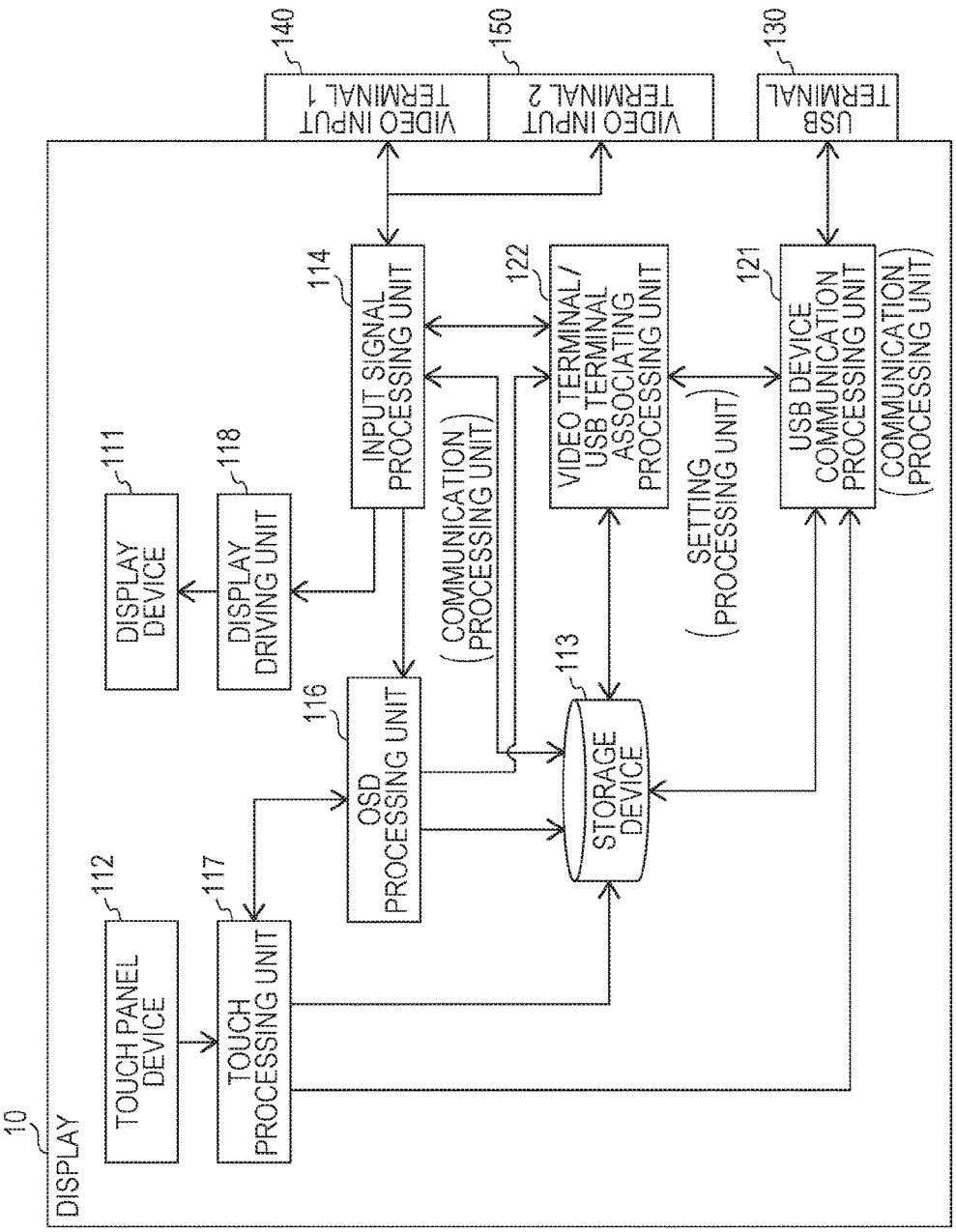
FIG. 1 is a block diagram illustrating a schematic configuration of a display that constitutes a display system according to a first embodiment.
Figure 2:
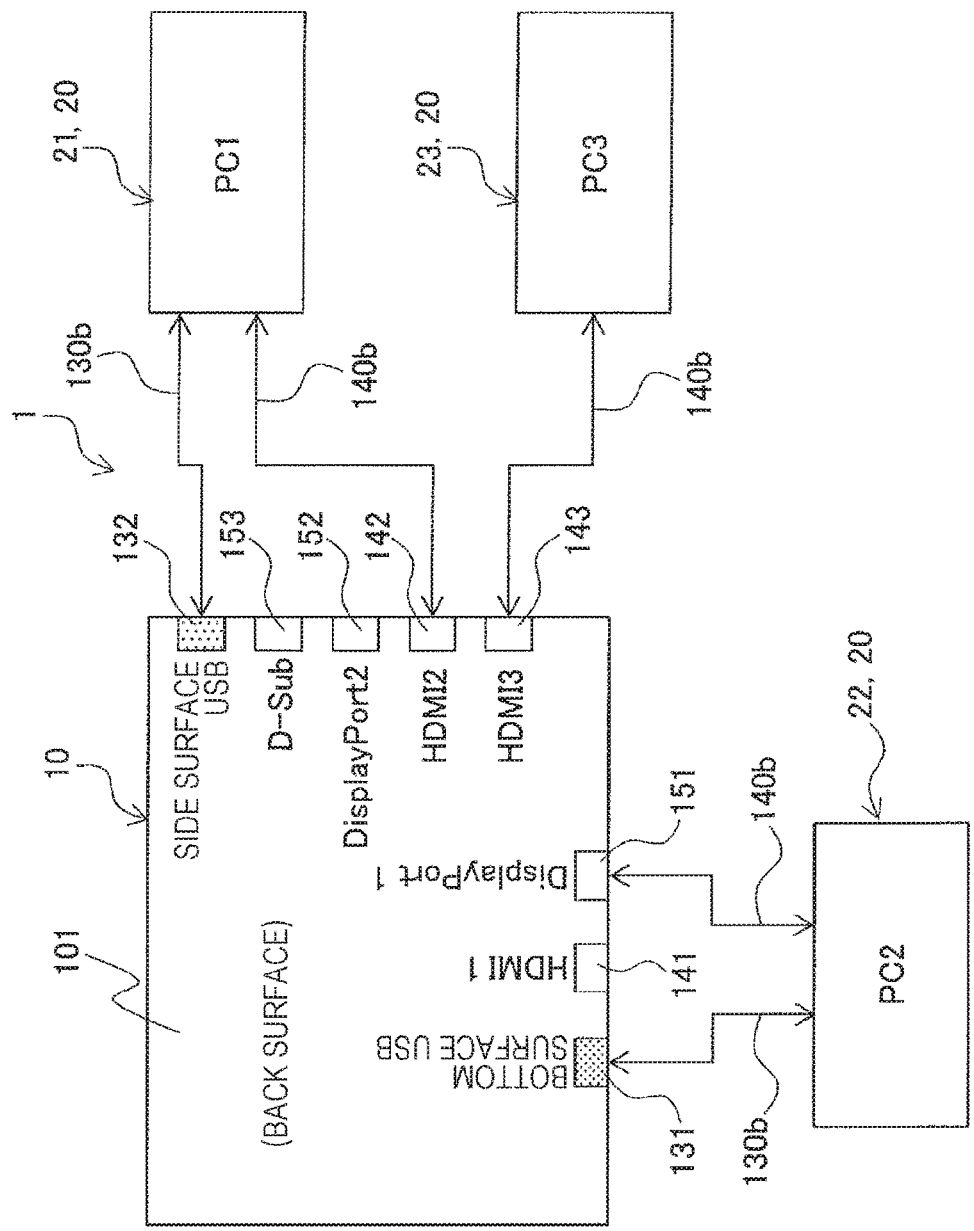
FIG. 2 is an explanatory view schematically illustrating an overall configuration of the display system.

FIG. 1 is a block diagram illustrating a schematic configuration of a display that constitutes a display system according to a first embodiment that is an example of embodiments of the disclosure, and FIG. 2 is an explanatory view schematically illustrating an overall configuration of the display system.

A display (display apparatus) 10 used for a display system 1 according to the first embodiment is a display with a large screen. As illustrated in FIGS. 1 and 2, the display 10 is a display in which connection for communicating a control signal and a video signal is performed between the display 10 and two or more information processing apparatuses 20 (21, 22, 23) and an operation by an information processing apparatus 20 that is connected is allowed. The display 10 includes two or more USB terminals (control signal connection units) 130 (131, 132) by which connection for communicating the control signal is performed between the display 10 and each of the information processing apparatuses 20, and two or more video input terminals (first video input terminal 140, second video input terminal 150) by which connection for communicating the video signal is performed between the display 10 and the information processing apparatus 20. The display 10 further includes an input signal processing unit (inherent information transmission unit) 114 that, when connection for communicating the control signal or connection for communicating the video signal is detected between the display 10 and the information processing apparatus 20, transmits inherent information of the display 10 to the information processing apparatus 20 connected to the display 10, and a video terminal/USB terminal associating processing unit (setting processing unit) 122 that requests, to the information processing apparatus 20 connected to a USB terminal 130, inherent information of a display apparatus connected to the information processing apparatus 20, determines, on the basis of the inherent information transmitted from the information processing apparatus 20, whether or not the information processing apparatus 20 is connected to a video input terminal of the display 10, and specifies a video input terminal connected to the information processing apparatus 20.

In the first embodiment, by the display system 1, as illustrated in FIG. 2, when each of the two or more information processing apparatuses 20 (21, 22, 23) is connected to the display 10 and operated, a USB cable 130b of the information processing apparatus 20 operating is connected to the USB terminal 131 or 132 of the display 10 while a video cable 140b being connected, and therefore setting is automatically performed for the display 10.

First, a configuration of the display 10 according to the first embodiment will be described. As illustrated in FIG. 1, the display 10 includes the USB terminal 130, the first video input terminal 140, the second video input terminal 150, a display device 111, a touch panel device 112, a storage device 113, the input signal processing unit 114, an OSD processing unit 116, a touch processing unit 117, and a display driving unit 118, and further includes a USB device communication processing unit 121 and the video terminal/USB terminal associating processing unit 122.

The USB terminal 130 is a terminal for transmitting and receiving data such as touch information or connection display information.

The first video input terminal 140 and the second video input terminal 150 are terminals such as a HDMI terminal, a display port terminal, a DVI/VGA terminal, or the like for receiving a video signal.

Any video signal may be input regardless of whether the video signal is an analog or digital signal.

The display device 111 is a CRT, liquid crystal, LED, or plasma display device, for example.

The touch panel device 112 is an infrared or electrostatic capacitive touch panel device, for example.

The storage device 113 saves temporary information used for each processing and saves setting information of the display 10. In general, two or more storage devices are provided in one display and a storage device is suitably selected based on performance such as volatility.

The input signal processing unit 114 performs reception processing of a video signal, switching processing for selecting a video signal to be displayed from among video signals received from two or more video input terminals, processing for applying a spatiotemporal filter to video data obtained from the video signal, and the like.

The input signal processing unit 114 functions as an inherent information transmission unit, and when the display 10 is connected to an external information processing apparatus via a video input terminal, transmits inherent information (connection display information) of the display 10.

The OSD processing unit 116 performs processing for displaying, for example, a menu where setting of the display 10 is able to be performed. The video terminal/USB terminal associating processing unit 122 is able to be called through an OSD operation.

The touch processing unit 117 derives operation information, such as touched coordinates, from input information to the touch panel display 112.

The display driving unit 118 converts video data to data of a format that is able to be displayed by the display device 111 and outputs the resultant.

The USB device communication processing unit 121 functions as an inherent information transmission unit and transmits or receives, for example, touch information or inherent information (connection display information) of a display connected to a personal computer. The USB device communication processing unit 121 transmits, to the information processing apparatus 20 connected via the USB terminal 130, an information acquisition request command for requesting inherent information of a display connected to the information processing apparatus 20.

The inherent information is information included in EDID of the display 10 and includes information about a manufacturer name, a model name, a product code, and a serial number of a display apparatus, and information of a connection terminal, to specify a display. As the information of a connection terminal, difference between a HDMI terminal, a display port, and the like is also included.

The video terminal/USB terminal associating processing unit 122 acquires inherent information of the display, the information processing apparatus 20 having the inherent information, through the USB device communication processing unit 121 and the input signal processing unit 114, associates the first video input terminal 140 or the second video input terminal 150 with the USB terminal 130, and saves the association result in the storage device 113. Then, on the basis of the inherent information, the video terminal/USB terminal associating processing unit 122 determines whether or not the information processing apparatus 20 is connected to the display 10 and specifies a video input terminal connected to the information processing apparatus 20.

In the display 10, as illustrated in FIG. 2, the USB terminal 131, a HDMI 1 terminal 141 as the first video input terminal 140, and a display port 1 terminal 151 as the second video input terminal 150 are provided on the bottom surface side of a back surface 101, and the USB terminal 132, a HDMI 2 terminal 142 and a HDMI 3 terminal 143 as the first video input terminal 140, and a display port 2 terminal 152 and a D-sub terminal 153 as the second video input terminal 150 are provided on a side surface side of the back surface 101.

The two or more information processing apparatuses 21, 22, and 23 are respectively indicated as a PC 1, a PC 2, and a PC 3 in FIG. 2.

The display 10 and the information processing apparatuses 21, 22, and 23 are connected via USB cables 130b to transmit and receive control signals, and are connected via video cables 140b to transmit and receive video signals.

Next, processing for setting the information processing apparatus 20 whose operation is to be reflected in the display 10 in the display system 1 will be described with reference to a flowchart.

Figure 3:
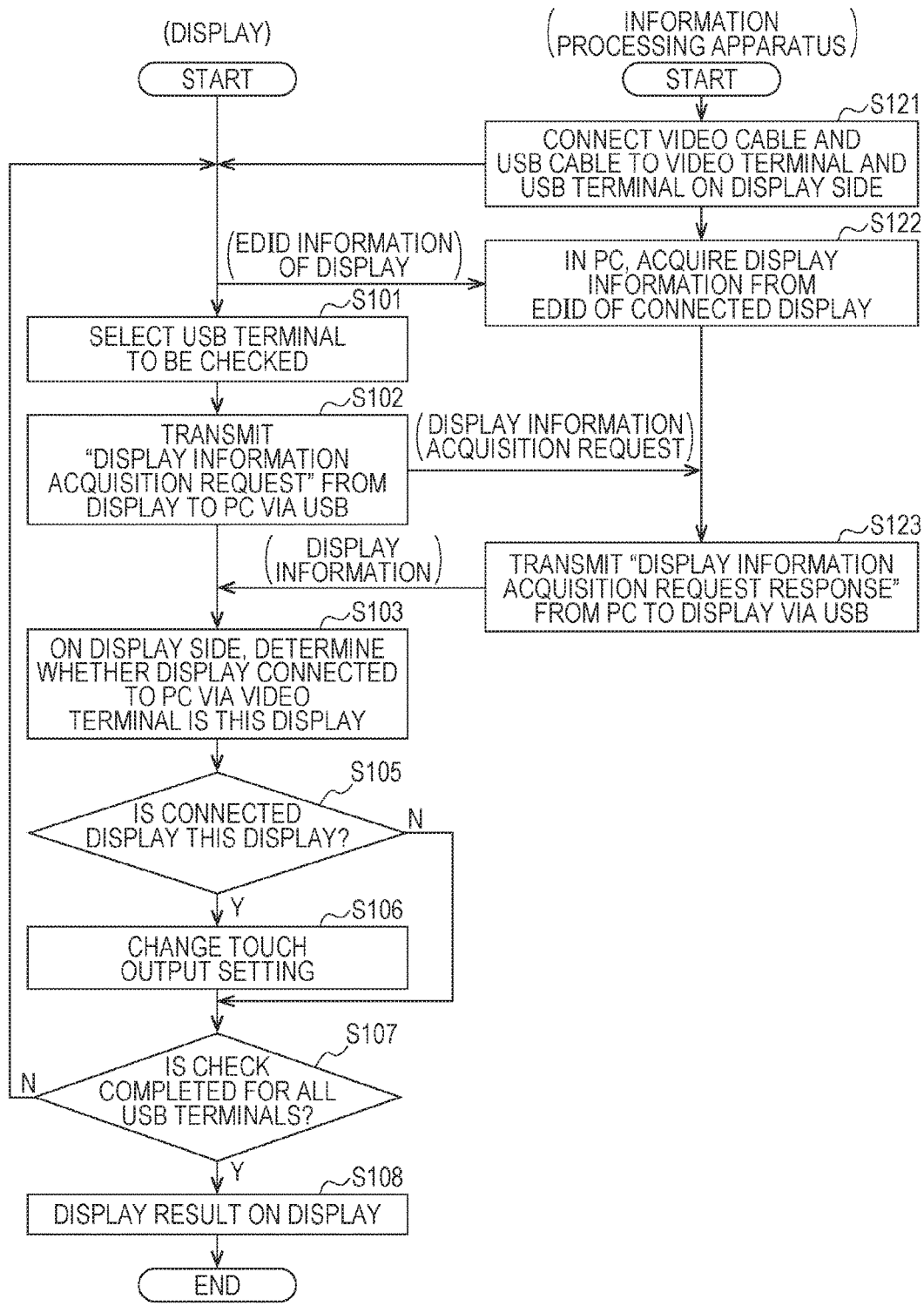
FIG. 3 is a flowchart illustrating processing for setting an information processing apparatus to the display in the display system.

FIG. 3 is a flowchart illustrating processing for setting the information processing apparatus 20 to the display 10 in the display system 1 of the first embodiment.

Note that, in the description of the flowchart of FIG. 3, the configuration of each unit in FIGS. 1 and 2 is referenced.

In a case where, in the display system 1, the information processing apparatus 20 is connected to the display 10 to perform setting of reflecting an operation, as illustrated in FIG. 3, first, the USB cable 130b and the video cable 140b that are connected to the information processing apparatus 20 are connected to the USB terminal (USB terminal 131 or USB terminal 132) and the video input terminal (HDMI terminal or display port) on the display 10 side (step S121).

When the display 10 and the information processing apparatus 20 are connected via the video cable 140b or the USB cable 130b, EDID information of the display 10 is transmitted from the display 10 to the information processing apparatus 20 by the input signal processing unit 114 or the USB device communication processing unit 121.

In the information processing apparatus 20, display information that is inherent information is acquired from the EDID information of the display 10 that is connected (step S122).

In the display 10, the USB terminal whose connection state is to be checked is selected (step S101), and a "display information acquisition request" to transmit the display information that is the inherent information is transmitted from the display 10 to the information processing apparatus 20 via the USB cable 130b (step S102).

In the information processing apparatus 20, upon reception of the "display information acquisition request", a "display information acquisition request response" that includes the display information is transmitted to the display 10 (step S123).

In the display 10, the video terminal/USB terminal associating processing unit 122 performs processing for determining whether a display connected to the information processing apparatus 20 via the video input terminal is the display 10 (step S103).

When the video terminal/USB terminal associating processing unit 122 determines that the display connected to the information processing apparatus 20 is the display 10, the procedure proceeds to step S106, and when determining that the display connected to the information processing apparatus 20 is not the display 10, the procedure proceeds to step S107 (step S105).

At step S106, the USB terminal and the video input terminal that are connected to the display 10 and the information processing apparatus 20 are specified and touch output setting is changed so as to reflect an operation of the information processing apparatus 20.

At step S107, whether or not the connection check is completed for all USB terminals is determined. In a case where it is determined at step S107 that the connection check is completed for all the USB terminals, a result of the touch output setting is displayed on the display device 111 of the display 10 (step S108).

On the other hand, in a case where it is determined at step S107 that the connection check is not completed for all the USB terminals, the procedure returns to step S101 and the checking processing is continuously performed for a USB terminal that is not checked.

In this manner, after the connection check is performed for all the USB terminals, the result of the touch output setting is displayed on the display device 111 of the display 10 (step S108), and processing for setting the information processing apparatus 20 ends.

Note that, in a case where there is no valid combination of a USB terminal and a video input terminal between the display 10 and the information processing apparatus 20, it may be notified that there is no valid combination of a USB terminal and a video input terminal or that there is no information processing apparatus to be set.

In a case where there is no USB terminal connected between the display 10 and the information processing apparatus 20, it may be notified that no USB terminal is connected.

Next, a case where the display 10 is operated by information processing apparatuses of two or more users in the display system 1 of the first embodiment will be described with reference to drawings.

Figure 4:
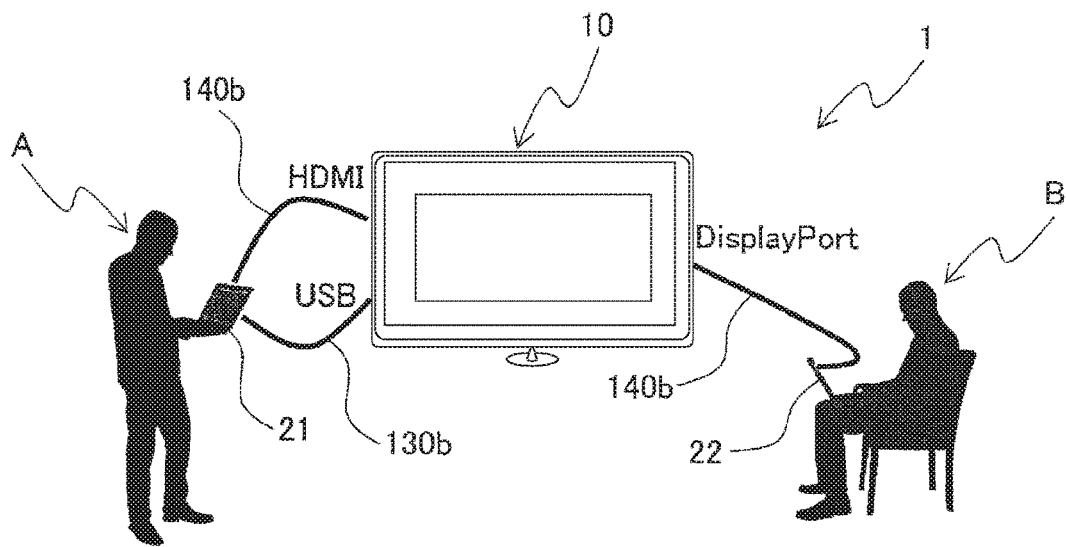
FIG. 4 is an explanatory view illustrating an example of a case where two or more users operate the display by using information processing apparatuses of the two or more users in the display system.
Figure 5:
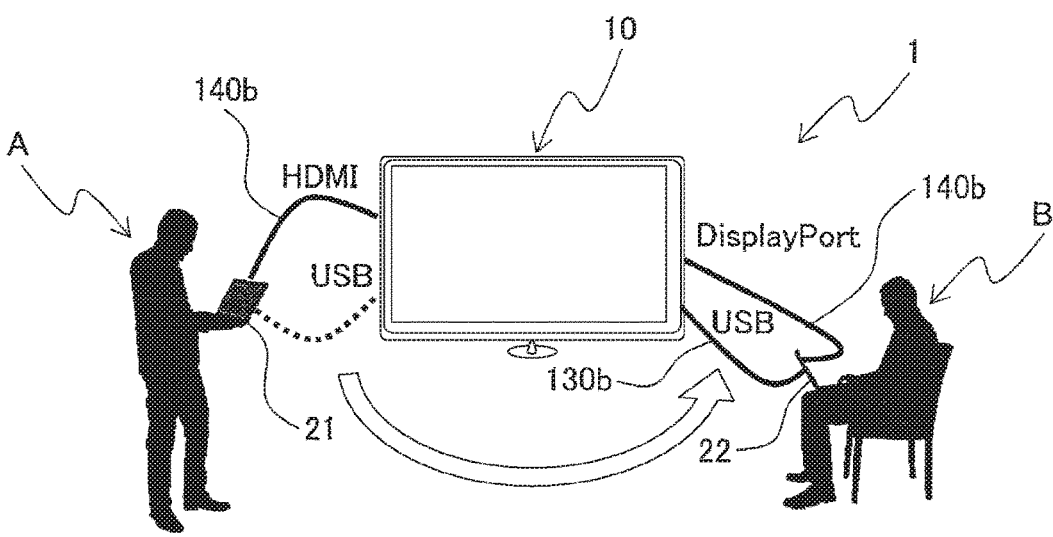
FIG. 5 is an explanatory view illustrating a state where an information processing apparatus of a user operating is switched from an information processing apparatus of one user to an information processing apparatus of another user in the display system.

FIG. 4 is an explanatory view illustrating an example of a case where two or more users operate the display by information processing apparatuses of the two or more users in the display system according to the first embodiment, and FIG. 5 is an explanatory view illustrating a state where an information processing apparatus of a user operating is switched in the display system.

Here, as illustrated in FIG. 4, in the display system 1, the information processing apparatus 21 of a user A has the video cable 140b connected to the HDMI terminal of the display 10 and the USB cable 130b connected to the USB terminal of the display 10.

On the other hand, the information processing apparatus 22 of a user B has the video cable 140b connected to the display port terminal of the display 10 but does not have the USB cable 130b connected.

At this time, the display device 111 of the display 10 displays that an output destination of a touch operation in the display 10 is the "HDMI terminal".

In such a state, when the information processing apparatus 21 of the user A is connected to the display 10 via the USB cable 130b so as to allow communication of the control signal and connected to the HDMI terminal via the video cable 140b so as to allow communication of the video signal, the information processing apparatus 21 of the user A is automatically subjected to setting of video output and setting of operation output (setting of an output destination of the touch operation in the display 10).

Accordingly, video of the information processing apparatus 21 of the user A is displayed on the display 10 and the operation in the information processing apparatus 21 is reflected in the display 10. The information processing apparatus 21 is set as an output destination of the touch operation in the display 10.

On the other hand, since the information processing apparatus 22 of the user B is not subjected to output setting with respect to the display 10, neither display of the video nor the touch operation by the display 10 is reflected.

In a case where an operation using the display 10 is performed by the information processing apparatus 22 of the user B, as illustrated in FIG. 5, setting is changed only by disconnecting the USB cable 130b connected to the information processing apparatus 21 of the user A and connecting the information processing apparatus 22 of the user B with the display 10 via the USB cable 130b, and therefore the operation by the information processing apparatus 22 of the user B is reflected in the display 10. At this time, it is specified that the information processing apparatus 22 of the user B is connected to the display port terminal of the display 10 via the video cable 140b.

Accordingly, video of the information processing apparatus 22 of the user B is displayed on the display 10 and the operation by the information processing apparatus 22 is reflected in the display 10. The information processing apparatus 22 is set also as an output destination of the touch operation by the display 10.

At this time, the display device 111 of the display 10 displays that new USB connection is detected and the output destination of the touch operation is changed from the "HDMI terminal" to the "display port terminal".

In this manner, only by changing a connection destination of the USB cable 130b connected to the information processing apparatus, a specific information processing apparatus is able to be automatically set without changing setting in the display 10.

With such a configuration, according to the first embodiment, the display 10, in which connection for communicating a control signal and a video signal is performed between the display 10 and the information processing apparatus 20 and an operation by the information processing apparatus 20 that is connected is allowed, includes the two or more USB terminals (USB terminals 131, 132), the two or more video input terminals (first video input terminal 140, second video input terminal 150), the USB device communication processing unit 121, and the video terminal/USB terminal associating processing unit 122, and thus information of the information processing apparatus 20 as a connection destination of the display 10 is able to be easily acquired by transmitting and receiving the control signal via a USB terminal. Accordingly, on the basis of acquired inherent information of a display connected to the information processing apparatus 20 and inherent information of the display 10, it is possible to easily determine a USB terminal and a video input terminal connected to the information processing apparatus 20 and the display 10 and automatically set a combination of a USB terminal and a video input terminal of the information processing apparatus 20 that is connected, without performing setting of the information processing apparatus 20 for the display 10 by the user. As a result, a conference proceeds efficiently by using the display 10 with the large screen.

Second Embodiment

Next, a second embodiment will be described.

Figure 6:
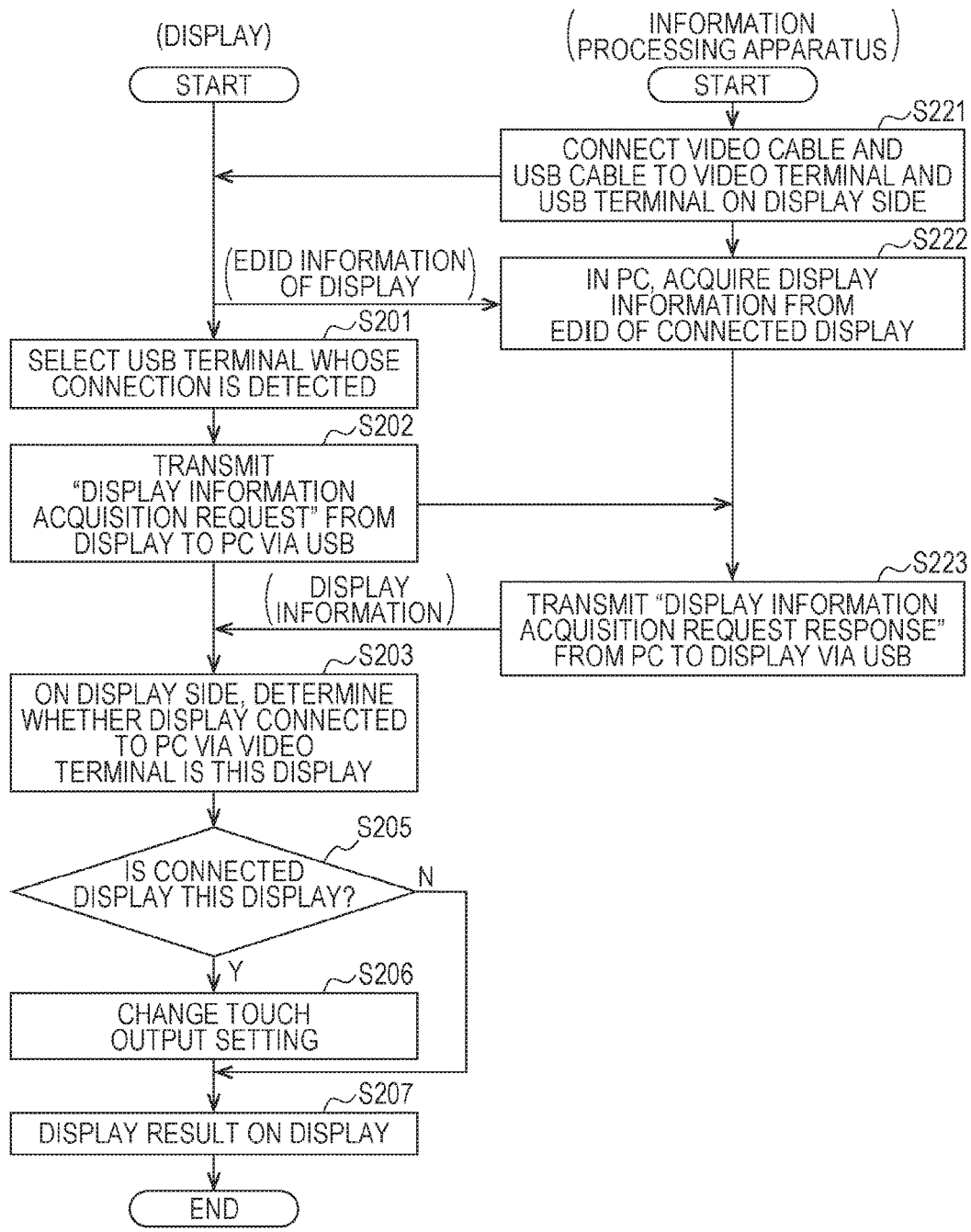
FIG. 6 is a flowchart illustrating processing for setting an information processing apparatus to a display in a display system according to a second embodiment.

FIG. 6 is a flowchart illustrating processing for setting an information processing apparatus to a display in a display system according to the second embodiment.

Note that, the display system of the second embodiment has a configuration similar to that of the display system of the first embodiment and is different from that of the first embodiment in a part of a processing step of setting an information processing apparatus. An element having a similar configuration is given the same reference sign and description thereof is omitted.

In the description of the flowchart of FIG. 6, the configuration of each unit in FIGS. 1 and 2 is referenced.

In the second embodiment, setting is performed only on an information processing apparatus whose connection to a USB terminal is detected by the display in the display system.

Processing for setting the information processing apparatus 20 whose operation is to be reflected in the display 10 in the display system 10 will be described below in accordance with the flowchart.

In the second embodiment, in a case where, in the display system 1, the information processing apparatus 20 is connected to the display 10 to perform setting of reflecting an operation, as illustrated in FIG. 6, first, the USB cable 130b and the video cable 140b that are connected to the information processing apparatus 20 are connected to the USB terminal (USB terminal 131 or USB terminal 132) and the video input terminal (HDMI terminal or display port) on the display 10 side (step S221).

When the display 10 and the information processing apparatus 20 are connected via the video cable 140b, EDID information of the display 10 is transmitted from the display 10 to the information processing apparatus 20 by the input signal processing unit 114.

In the information processing apparatus 20, display information that is inherent information is acquired from the EDID information of the display 10 that is connected (step S222).

In the display 10, the USB terminal whose connection is detected is selected (step S201), and a "display information acquisition request" to transmit the display information that is the inherent information is transmitted from the display 10 to the information processing apparatus 20 via the USB cable 130b (step S202).

In the information processing apparatus 20, upon reception of the "display information acquisition request", a "display information acquisition request response" that includes the display information is transmitted to the display 10 (step S223).

In the display 10, the video terminal/USB terminal associating processing unit 122 performs processing for determining whether a display connected to the information processing apparatus 20 via the video input terminal is the display 10 (step S203).

When the video terminal/USB terminal associating processing unit 122 determines that the display connected to the information processing apparatus 20 is the display 10, the procedure proceeds to step S206, and when determining that the display connected to the information processing apparatus 20 is not the display 10, the procedure proceeds to step S207 (step S205).

At step S206, the USB terminal and the video input terminal that are connected to the display 10 and the information processing apparatus 20 are specified and touch output setting is changed so as to reflect the operation of the information processing apparatus 20.

At step S207, a result of the touch output setting is displayed on the display device 111 of the display 10.

In this manner, after the connection check is performed for the USB terminal connected to the display 10, the result of the touch output setting is displayed on the display device 111 of the display 10, and processing for setting the information processing apparatus 20 ends.

Note that, in a case where there is no valid combination of a USB terminal and a video input terminal between the display 10 and the information processing apparatus 20, it may be notified that there is no valid combination of a USB terminal and a video input terminal or that there is no information processing apparatus to be set.

With such a configuration, according to the second embodiment, in a case where it is detected that one information processing apparatus 20 is connected to the USB terminal of the display 10 in the display system 1, touch output setting is able to be easily performed so as to reflect the operation of the information processing apparatus 20 by specifying the video input terminal connected to the display 10.

Third Embodiment

Next, a third embodiment of the disclosure will be described.

Figure 7:
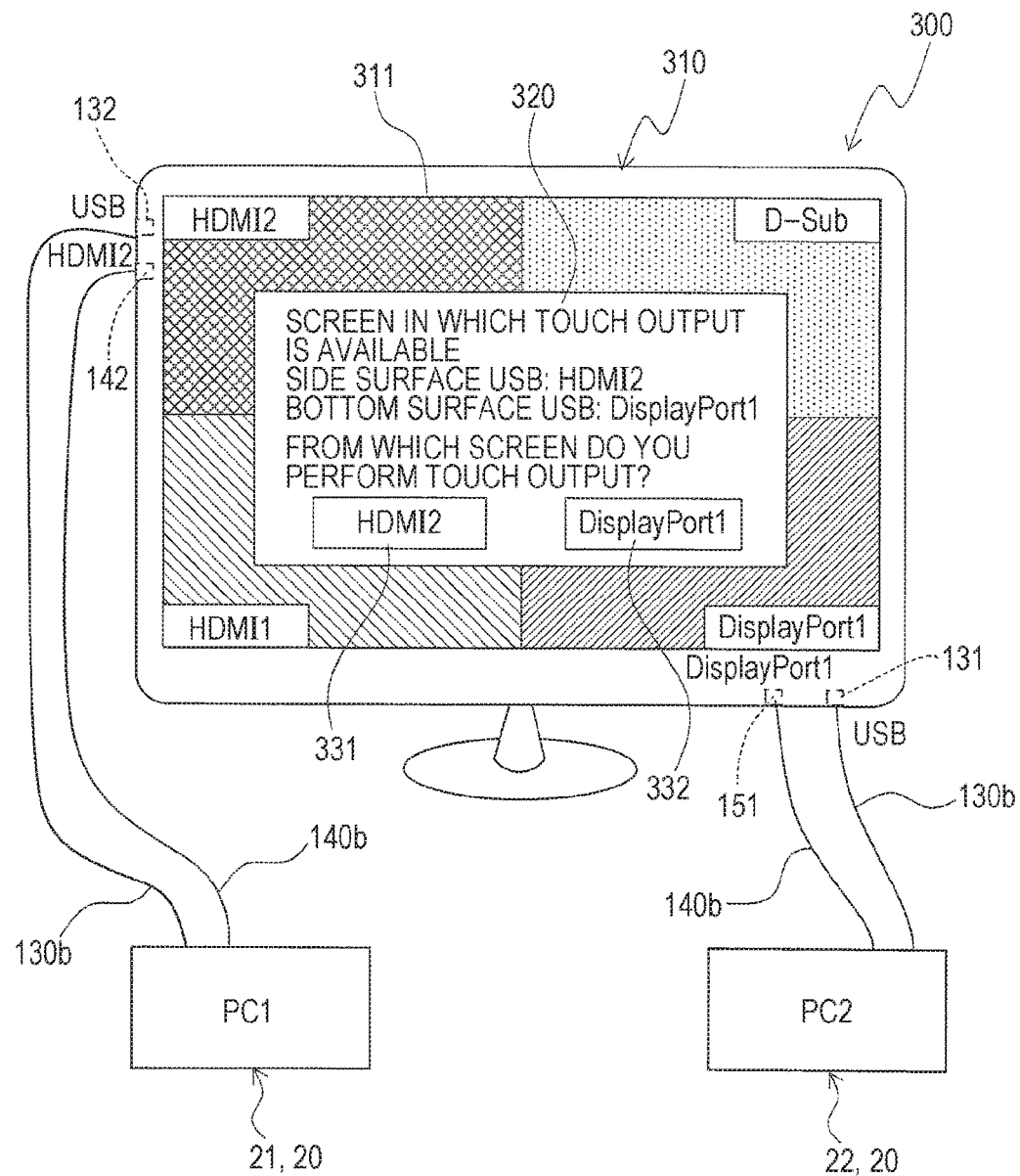
FIG. 7 is an explanatory view illustrating an example of multi-screen display by a display of a display system according to a third embodiment.
Figure 8:
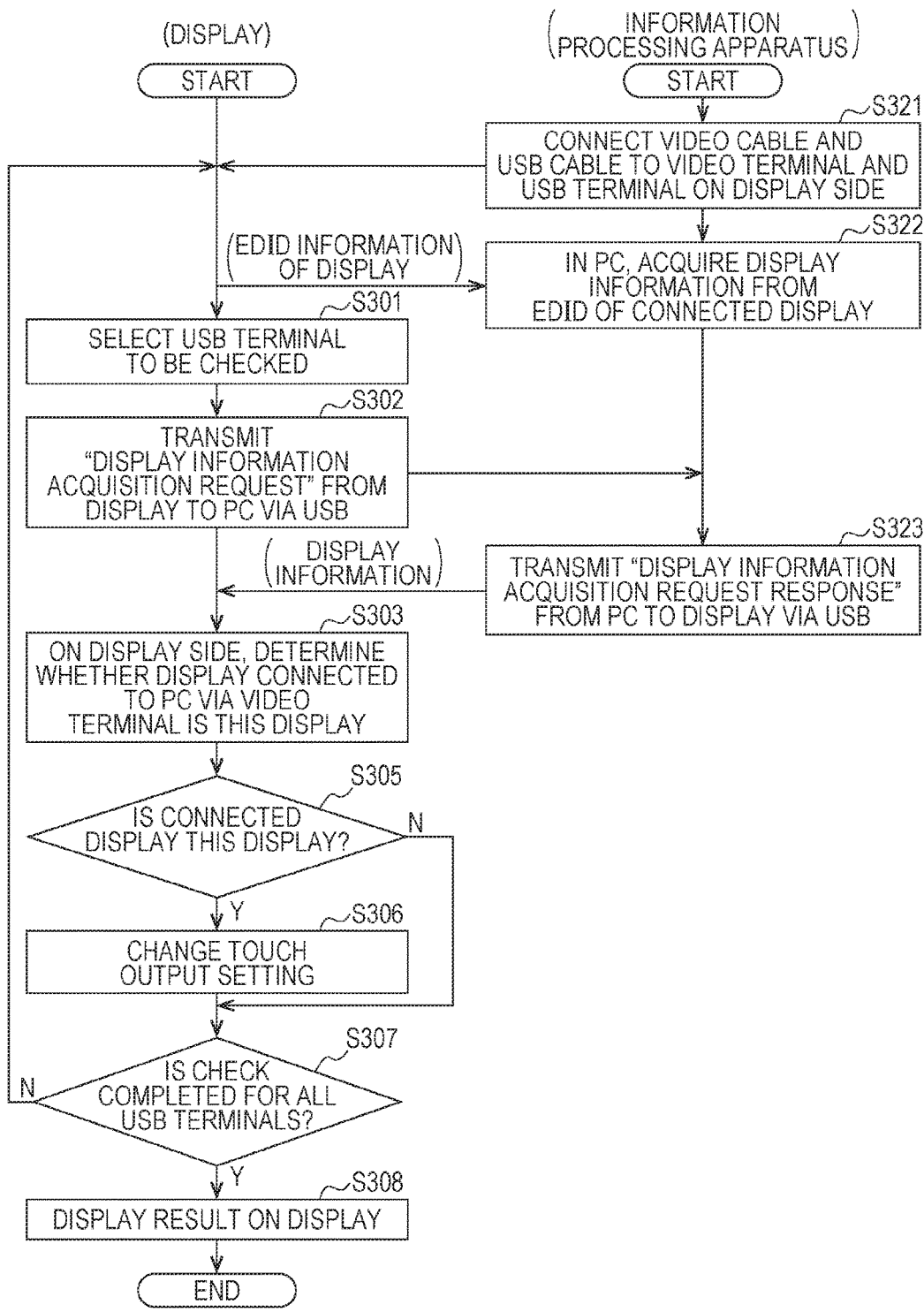
FIG. 8 is a flowchart illustrating processing for setting an information processing apparatus to the display in the display system.
Figure 9:
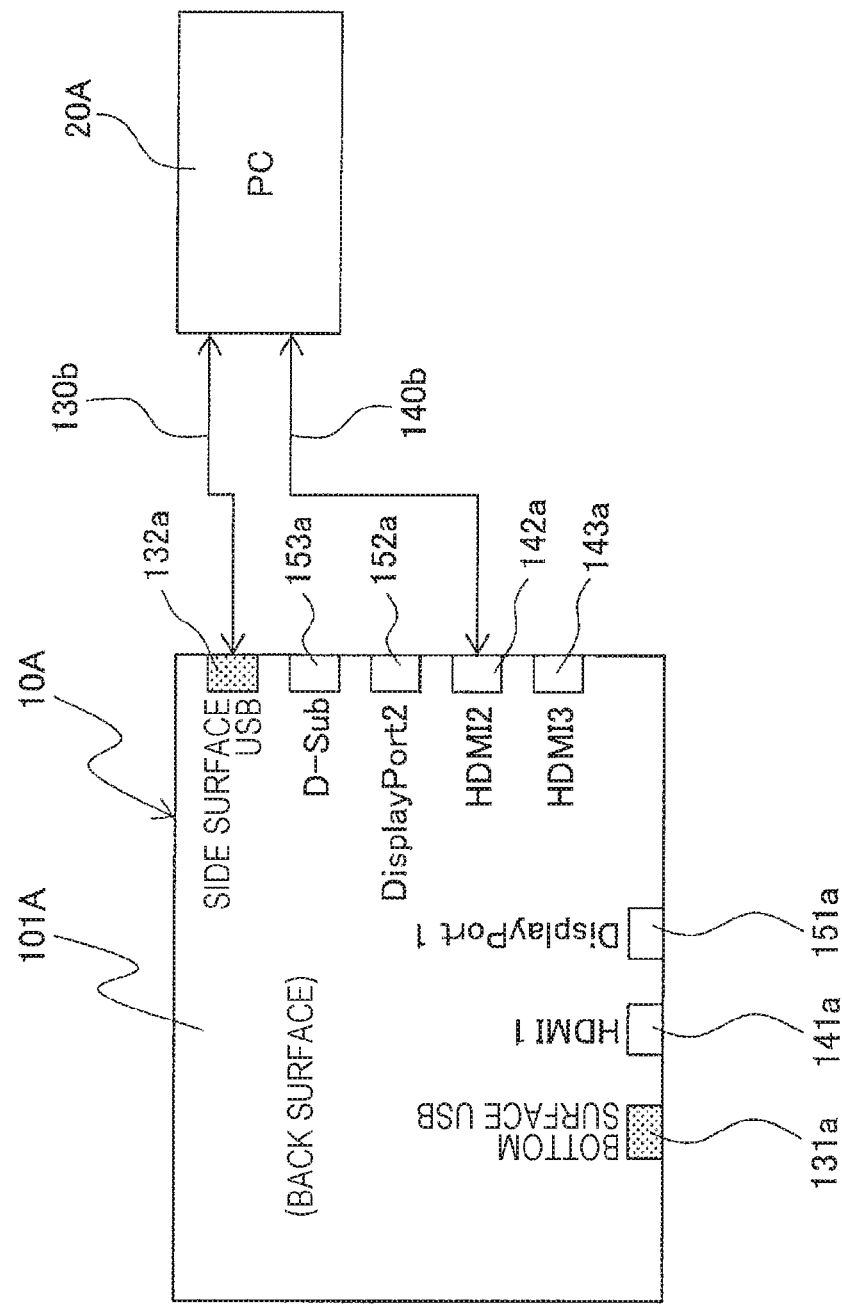
FIG. 9 is an explanatory view schematically illustrating a configuration of a display of the related art.

FIG. 7 is an explanatory view illustrating an example of multi-screen display by a display of a display system according to the third embodiment, and FIG. 8 is a flowchart illustrating processing for setting an information processing apparatus to the display in the display system.

Note that, the display system of the third embodiment has a configuration similar to that of the display system of the first embodiment and is different from that of the first embodiment in a part of a processing step of setting an information processing apparatus. An element having a similar configuration is given the same reference sign and description thereof is omitted.

In the description of the flowchart of FIG. 8, the configuration of each unit in FIGS. 1 and 2 is referenced.

In the third embodiment, in a case where multi-screen display is performed on a display device 311 of a display 310 as illustrated in FIG. 7 in a display system 300, when a user checks a combination of a USB terminal and a video input terminal in a manner similar to single screen display and selects a screen in which touch output is to be performed, touch output setting of an information processing apparatus corresponding to the screen is performed.

In the display system 300, information processing apparatuses 21 and 22 are connected to the display 310.

The information processing apparatus 21 has the USB cable 130b connected to the USB terminal 132 on a side surface side of the display 310 and has the video cable 140b connected to the HDMI 2 terminal 142 on the side surface side.

The information processing apparatus 22 has the USB cable 130b connected to the USB terminal 131 on a bottom surface side of the display 310 and has the video cable 140b connected to the display port 1 terminal 151 on the bottom surface side.

The display 310 recognizes connection states of the information processing apparatuses 21 and 22 and displays a result thereof on the display device 311 as a setting screen 320.

In the setting screen 320, key switches 331 and 332 by which a screen for touch output is selected are displayed, and thus a screen in which touch output setting is performed, that is, the information processing apparatus 20 in which touch output setting is performed is selected by the user.

Only by performing a touch operation of touching a key switch in the screen, in which touch output setting is performed, in the setting screen 320, the user is able to select the information processing apparatus 20 in which touch output setting is performed.

Next, processing for setting the information processing apparatus 20 whose operation is reflected in the display 310 in the display system 300 will be described in accordance with the flowchart.

In the third embodiment, in a case where, in the display system 300, the information processing apparatus 20 (21, 22) is connected to the display 310 to perform setting of reflecting an operation, as illustrated in FIG. 8, first, the USB cable 130b and the video cable 140b that are connected to the information processing apparatus 20 (21, 22) are connected to the USB terminal (USB terminal 131 or USB terminal 132) and the video input terminal (HDMI terminal or display port) on the display 310 side (step S321).

When the display 310 and the information processing apparatus 20 (21, 22) are connected via the video cable 140b, EDID information of the display 310 is transmitted from the display 310 to the information processing apparatus 20 (21, 22) by the input signal processing unit 114.

In the information processing apparatus 20 (21, 22), display information that is inherent information is acquired from the EDID information of the display 310 that is connected (step S322).

In the display 310, the USB terminal to be checked is selected (step S301), and a "display information acquisition request" to transmit the display information that is the inherent information is transmitted from the display 310 to the information processing apparatus 20 (21, 22) via the USB cable 130b (step S302).

In the information processing apparatus 20 (21, 22), upon reception of the "display information acquisition request", a "display information acquisition request response" that includes the display information is transmitted to the display 310 (step S323).

In the display 310, the video terminal/USB terminal associating processing unit 122 performs processing for determining whether a display connected to the information processing apparatus 20 (21, 22) via the video input terminal is the display 310 (step S303).

When the video terminal/USB terminal associating processing unit 122 determines that the display connected to the information processing apparatus 20 (21, 22) is the display 310, the procedure proceeds to step S306, and when determining that the display connected to the information processing apparatus 20 (21, 22) is not the display 310, the procedure proceeds to step S307 (step S305).

At step S306, the USB terminal and the video input terminal that are connected to the display 310 and the information processing apparatus 20 (21, 22) are specified and touch output setting is changed so as to reflect the operation of the information processing apparatus 20 (21, 22).

At step S307, whether or not the connection check is completed for all USB terminals is determined. In a case where it is determined at step S307 that the connection check is completed for all the USB terminals, a result of the touch output setting is displayed on the display device 311 of the display 310 (step S308).

On the other hand, in a case where it is determined at step S307 that the connection check is not completed for all the USB terminals, the procedure returns to step S301 and the checking processing is continuously performed for a USB terminal that is not checked.

In this manner, after the connection check is performed for all the USB terminals, the result of the touch output setting is displayed on the display device 311 of the display 310 (step S308), and processing for setting the information processing apparatus 20 (21, 22) ends.

In the result display on the display device 311 of the display 310, as illustrated in FIG. 7, in a case where there is a valid combination of a USB terminal and a video input terminal as in the information processing apparatuses 21 and 22 with respect to an input video subjected to multi-screen display on the display 310, the setting screen 320 may be displayed on the display device 311 to select a screen in which a touch operation is to be made valid, by using the key switch 331 or 332.

With such a configuration, according to the third embodiment, in a case where multi-screen display is performed on the display device 311 of the display 310 in the display system 300, when there is a valid combination of a USB terminal and a video input terminal in the two or more information processing apparatuses 20, the setting screen 320 where a screen for setting touch output is able to be selected is displayed, and thus only by selecting the screen for setting touch output, the user is able to easily specify and set the information processing apparatus 20 subjected to touch output setting.

As described above, the disclosure is not limited to the embodiments described above, and various changes are able to be made within the scope indicated in the claims. It is obvious that various kinds of change examples or modification examples will occur to those skilled in the art within the scope of the claims. That is, an embodiment obtained by combination of technical means changed as appropriate without departing from the spirit of the disclosure is also included in the technical scope of the disclosure.

The present disclosure contains subject matter related to that disclosed in Japanese Priority Patent Application JP 2017-095682 filed in the Japan Patent Office on May 12, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus connectable to an information terminal apparatus in which setting processing is able to be performed on a basis of a control signal that is received, the display apparatus comprising:
   a control signal connection unit by which connection for communicating a control signal is performed with the information terminal apparatus;
   two or more video signal connection units by each of which connection for communicating a video signal is performed with the information terminal apparatus; and
   a setting processing unit that requests, to the information terminal apparatus connected to the control signal connection unit, inherent information acquired from the display apparatus connected to the information terminal apparatus, determines, on a basis of the inherent information received from the information terminal apparatus, whether or not the information terminal apparatus is connected to a video signal connection unit of the display apparatus, and specifies the control signal connection unit and the video signal connection unit that are connected to the information terminal apparatus.

2. The display apparatus according to claim 1, further comprising
an inherent information transmission unit that, when connection between the information terminal apparatus and the video signal connection unit or the control signal connection unit is detected, transmits the inherent information of the display apparatus to the information terminal apparatus connected to the display apparatus.

3. The display apparatus according to claim 1, wherein the setting processing unit determines that the video signal connection unit and the control signal connection unit are connected to an identical information terminal apparatus when inherent information transmitted via the video signal connection unit and inherent information received via the control signal connection unit match.

4. The display apparatus according to claim 1, wherein the display apparatus displays a determination result by the setting processing unit on a display unit of the display apparatus.

5. A setting method for a display apparatus connectable to an information terminal apparatus in which setting processing is able to be performed on a basis of a control signal that is received, the setting method comprising:
performing connection for communicating a control signal with the information terminal apparatus;
performing connection for communicating a video signal with the information terminal apparatus;
requesting, to the information terminal apparatus that is connected so as to allow communication of the control signal, inherent information acquired from the display apparatus connected to the information terminal apparatus;
determining, on a basis of the inherent information received from the information terminal apparatus, whether or not the information terminal apparatus is connected to the display apparatus so as to allow communication of a video signal; and
specifying a connection unit allowing communication of a control signal and a communication unit allowing communication of a video signal, which are connected to the information terminal apparatus.

6. A display system comprising a display apparatus connectable to an information terminal apparatus in which setting processing is able to be performed on a basis of a control signal that is received, and an information terminal apparatus that is able to be connected to the display apparatus, wherein
the display apparatus includes:
a control signal connection unit by which connection for communicating a control signal is performed with the information terminal apparatus;
two or more video signal connection units by each of which connection for communicating a video signal is performed with the information terminal apparatus; and
a setting processing unit that requests, to the information terminal apparatus connected to the control signal connection unit, inherent information acquired from the display apparatus connected to the information terminal apparatus, determines, on a basis of the inherent information received from the information terminal apparatus, whether or not the information terminal apparatus is connected to a video signal connection unit of the display apparatus, and specifies the control signal connection unit and the video signal connection unit that are connected to the information terminal apparatus.

* * * * *